(12) United States Patent
Gaudron et al.

(10) Patent No.: US 8,858,143 B2
(45) Date of Patent: Oct. 14, 2014

(54) WALL ANCHOR

(75) Inventors: Paul Gaudron, Stratford, CT (US); Jacob Olsen, Roselle, IL (US)

(73) Assignee: Black & Decker Inc., Newark, DE (US)

( * ) Notice: Subject to any disclaimer, the term of this patent is extended or adjusted under 35 U.S.C. 154(b) by 766 days.

(21) Appl. No.: 12/772,568

(22) Filed: May 3, 2010

(65) Prior Publication Data
US 2011/0268528 A1 Nov. 3, 2011

(51) Int. Cl.
*F16B 21/00* (2006.01)
*F16B 13/08* (2006.01)

(52) U.S. Cl.
CPC .................................. *F16B 13/0808* (2013.01)
USPC .......................................... 411/344; 411/346

(58) Field of Classification Search
CPC ...... F16B 13/0808; F16B 37/04; F16B 13/08; F16B 13/002; F16B 21/10; F16B 21/12; F16B 5/0642; F16B 45/00; F16B 21/086; F16B 19/083; F16B 13/003; F16B 13/061; F16B 10/1054; F16B 13/0858; F16B 13/004; F16B 13/126; F16B 39/24; F16B 13/124; B28B 7/0014; B28B 7/0064; B60D 1/02; B60D 1/025; B25B 31/005; B60R 13/105
USPC ............... 411/29, 30, 31, 340, 341, 342, 343, 411/344, 345, 346
See application file for complete search history.

(56) References Cited

U.S. PATENT DOCUMENTS

| 3,389,631 | A | | 6/1968 | Vaillancourt | |
|---|---|---|---|---|---|
| 3,605,547 | A | * | 9/1971 | Millet | 411/344 |
| 3,651,734 | A | * | 3/1972 | McSherry | 411/15 |
| 3,927,597 | A | * | 12/1975 | Stults et al. | 411/341 |
| 4,043,245 | A | * | 8/1977 | Kaplan | 411/346 |
| 4,075,924 | A | * | 2/1978 | McSherry et al. | 411/112 |
| 4,120,231 | A | * | 10/1978 | Neumayer | 411/340 |
| 4,174,910 | A | * | 11/1979 | McSherry et al. | 402/19 |
| 4,181,061 | A | * | 1/1980 | McSherry | 411/55 |
| 4,221,154 | A | * | 9/1980 | McSherry | 411/34 |
| 4,283,986 | A | * | 8/1981 | Peterson et al. | 411/340 |
| 4,285,264 | A | * | 8/1981 | Einhorn | 411/345 |
| 4,294,156 | A | * | 10/1981 | McSherry et al. | 411/345 |
| 4,439,079 | A | | 3/1984 | Losada | |
| 4,502,826 | A | * | 3/1985 | Fafard | 411/340 |
| D284,449 | S | | 7/1986 | Lindell | |
| 4,650,386 | A | * | 3/1987 | McSherry et al. | 411/340 |
| 4,673,150 | A | * | 6/1987 | McSherry et al. | 248/73 |
| 4,704,057 | A | * | 11/1987 | McSherry | 411/55 |
| 4,752,170 | A | * | 6/1988 | McSherry et al. | 411/80.1 |
| D299,312 | S | | 1/1989 | Laessle | |
| 4,861,198 | A | | 8/1989 | Stankus | |

(Continued)

FOREIGN PATENT DOCUMENTS

WO 99/17031 A1 4/1999

*Primary Examiner* — Gay Ann Spahn

(74) *Attorney, Agent, or Firm* — Cantor Colburn LLP

(57) ABSTRACT

A wall anchor is provided and includes a wing manually urgeable through a substrate, a cutting element attached to the wing at a leading side thereof to cut through substrate material upon the manual urging, a strap assembly rotatably coupled to the wing and configured to be manually gripped and to have a pulling force exerted thereon to thereby urge the wing against the substrate and a cap disposed to be movable along the strap assembly, respective engagements of a member with the wing and the cap being sufficient to draw the wing and the cap toward one another.

24 Claims, 4 Drawing Sheets

(56) References Cited

U.S. PATENT DOCUMENTS

| | | | |
|---|---|---|---|
| 4,878,790 A * | 11/1989 | McSherry et al. | 411/34 |
| 4,993,901 A * | 2/1991 | McSherry et al. | 411/340 |
| 4,997,327 A | 3/1991 | Cira | |
| 5,028,186 A * | 7/1991 | McSherry | 411/34 |
| 5,037,257 A * | 8/1991 | Kubic et al. | 411/30 |
| 5,054,981 A * | 10/1991 | Schnedl | 411/340 |
| 5,067,864 A * | 11/1991 | Dewey et al. | 411/344 |
| D325,869 S | 5/1992 | Rubenstein et al. | |
| 5,139,377 A * | 8/1992 | Reed | 411/340 |
| 5,147,166 A * | 9/1992 | Harker | 411/29 |
| 5,195,856 A * | 3/1993 | McSherry et al. | 411/55 |
| 5,209,621 A | 5/1993 | Burbidge | |
| 5,221,169 A * | 6/1993 | McSherry et al. | 411/344 |
| 5,236,293 A * | 8/1993 | McSherry et al. | 411/344 |
| D352,656 S | 11/1994 | Rodman | |
| 5,702,218 A | 12/1997 | Onofrio | |
| 5,944,295 A * | 8/1999 | McSherry | 248/304 |
| 5,944,466 A | 8/1999 | Rudnicki et al. | |
| 6,161,999 A * | 12/2000 | Kaye et al. | 411/344 |
| D436,523 S | 1/2001 | Smith | |
| 6,203,260 B1 | 3/2001 | Henline et al. | |
| 6,250,865 B1 * | 6/2001 | McSherry | 411/344 |
| 6,821,069 B2 * | 11/2004 | Ikuta | 411/344 |
| 6,829,871 B1 * | 12/2004 | McSherry et al. | 52/705 |
| 7,547,171 B2 * | 6/2009 | McDuff | 411/400 |
| 7,587,873 B2 * | 9/2009 | Mcsherry et al. | 52/700 |
| 8,142,123 B2 * | 3/2012 | Holscher | 411/84 |
| 8,303,224 B2 * | 11/2012 | McDuff et al. | 411/341 |
| 8,449,236 B2 * | 5/2013 | McDuff et al. | 411/344 |
| 2001/0046429 A1 * | 11/2001 | Gaudron | 411/340 |
| 2004/0170486 A1 * | 9/2004 | DeMeo | 411/340 |
| 2005/0117996 A1 * | 6/2005 | Lemire | 411/340 |
| 2005/0238457 A1 * | 10/2005 | Mcsherry et al. | 411/61 |
| 2006/0083602 A1 * | 4/2006 | Lemire | 411/344 |
| 2006/0182515 A1 * | 8/2006 | Panasik et al. | 411/346 |
| 2006/0222474 A1 * | 10/2006 | Brown et al. | 411/340 |
| 2006/0239793 A1 * | 10/2006 | McDuff | 411/29 |
| 2008/0206014 A1 * | 8/2008 | Lemire | 411/344 |
| 2008/0253860 A1 * | 10/2008 | McDuff et al. | 411/344 |
| 2009/0003962 A1 * | 1/2009 | McDuff et al. | 411/344 |
| 2009/0169331 A1 * | 7/2009 | Pilon | 411/345 |
| 2012/0328392 A1 * | 12/2012 | Difante | 411/342 |
| 2013/0223952 A1 * | 8/2013 | Hickey | 411/345 |
| 2013/0230365 A1 * | 9/2013 | Gaudron et al. | 411/340 |
| 2013/0243546 A1 * | 9/2013 | McDuff et al. | 411/341 |
| 2013/0343831 A1 * | 12/2013 | McDuff et al. | 411/340 |

* cited by examiner

WALL ANCHOR

BACKGROUND OF THE INVENTION

The subject matter disclosed herein relates to wall anchors.

Wall anchors generally serve to anchor devices, such as fastening elements, in walls, such as hollow walls or walls made of dry wall or some other similar materials, which would not otherwise be able to provide reliable support to the fastening elements. Wall anchors typically function by distributing forces applied by the fastening elements over a relatively large area and may be formed in various configurations to that end.

In one such configuration, a relatively heavy duty hollow wall anchor is designed for use in base materials, such as plaster, wallboard, concrete block or hollow tile, that have been prepared by additional tools/tooling, such as the drilling of pilot holes using, for example, power tools. The anchor typically includes a carbon steel wing and a locking cap/ratchet leg assembly molded from engineered plastic. It is available in various sizes, can be installed in relatively small holes without fixture or screw settings, can be adjusted to accommodate various wall thicknesses and it allows for repeated screw/bolt installations and replacements.

BRIEF DESCRIPTION OF THE INVENTION

According to an aspect of the invention, a wall anchor is provided and includes a wing manually urgeable through a substrate, a cutting element attached to the wing at a leading side thereof to cut through substrate material upon the manual urging, a strap assembly rotatably coupled to the wing and configured to be manually gripped and to have a pulling force exerted thereon to thereby urge the wing against the substrate and a cap disposed to be movable along the strap assembly, respective engagements of a member with the wing and the cap being sufficient to draw the wing and the cap toward one another.

According to another aspect of the invention, a wall anchor is provided and includes a wing manually urgeable through a substrate and formed to define a first portion, which is engageable with a member, a cutting element attached to the wing at a leading side thereof to cut through material of the substrate upon the manual urging, a strap assembly rotatably coupled to the wing and configured to be manually gripped and to have a pulling force exerted thereon to thereby urge the wing against the substrate and a cap disposed to be movable along the strap assembly and formed to define a second portion, which is engageable with the member, respective engagements of the member with the first and second portions being sufficient to draw the wing and the cap toward one another.

According to yet another aspect of the invention, a wall anchor is provided and includes a wing manually urgeable through a substrate from a first side thereof to a second side thereof and formed to define a first portion, which is engageable with a member, a cutting element attached to the wing at a leading side thereof to cut through material of the substrate upon the manual urging, a strap assembly rotatably coupled to the wing and configured to be manually gripped and to have a pulling force exerted thereon to thereby urge the wing against the second side of the substrate following the urging of the wing through the substrate from the first to the second side thereof and a cap disposed to be movable along the strap assembly and formed to define a second portion, which is engageable with the member, respective engagements of the member with the first and second portions being sufficient to draw the wing and the cap toward one another.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
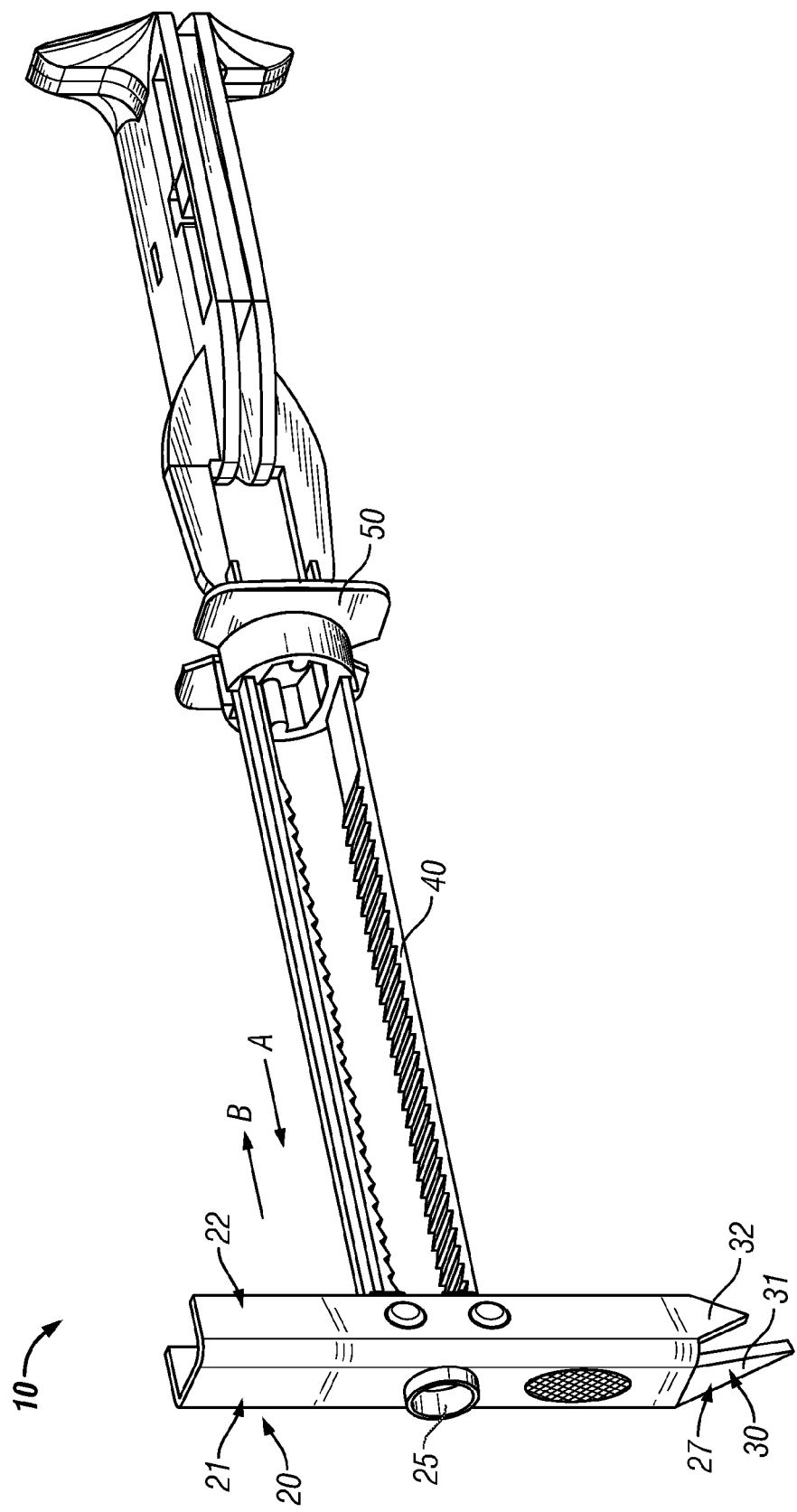
FIG. 1 is a perspective view of a wall anchor.

With reference to FIG. 1, a wall anchor 10 is provided. The wall anchor 10 includes a wing 20, a cutting element 30, a strap assembly 40 and a cap 50. The wing 20 is manually urgeable in a first direction A by a user, for example, through a substrate from a first side thereof to a second side thereof. The manual urging by the user may simply be a matter of the user pushing the wall anchor 10 through the substrate. The user need not employ tools or tooling for this and is not otherwise required to rotate the wall anchor 10 in any significant manner. The substrate may be a base material including at least one or more of plaster, wallboard, concrete and ceramic, for example, and does not need to have been prepared in advance. That is, the substrate does not need to have been drilled with pilot holes or the like.

The wing 20 and the cutting element 30 may each be formed of a metallic material, such as a metal or a metal alloy, or a relatively rigid material including but not limited to plastic. As an example, the wing 20 and the cutting element 30 may include Zinc, Chromate and/or other similar metallic or plastic material(s).

Figure 2:
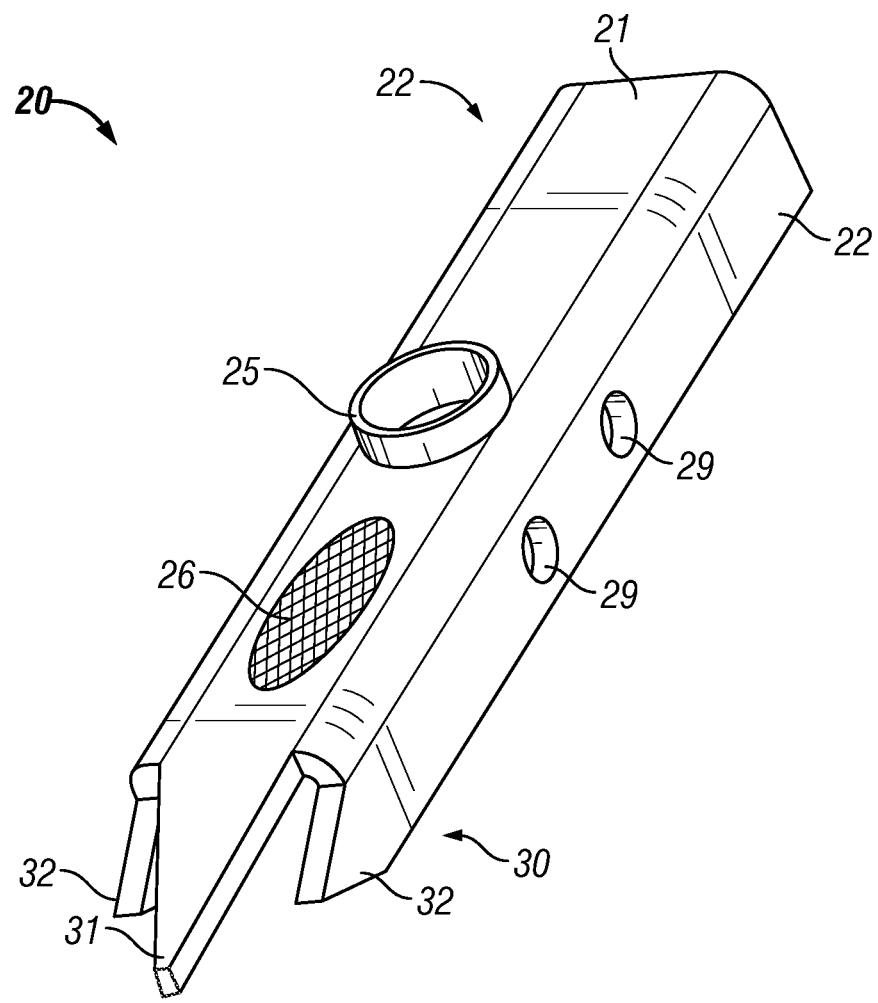
FIG. 2 is a perspective view of a wing of the wall anchor of FIG. 1.

With reference to FIGS. 1 and 2, the wing 20 may be formed in various configurations, shapes and sizes. In one exemplary configuration, the wing 20 may include an elongate planar main member 21 and elongate planar sidewalls 22. The sidewalls 22 may each be respectively attached to opposing edges of the main member 21 and oriented transversely to the main member 21. In this way, the wing 20 may have a substantially u-shaped configuration. The edges of the main member 21 and the sidewalls 22 may be rounded as well such that the substantially u-shaped configuration of the wing 20 may also have rounded corners. The wing 20 may be further formed to define a first portion 25 at the main member 21. The first portion 25 is engageable with a member, such as a bolt, a screw or any other similar device. As such, the first portion 25 may be an aperture extending through the main member 21 and having, in some cases, threading that is operably engageable with corresponding threading on the member.

The wing 20 may be handled manually by a user and may include at least one or more gripping portions 26 that increase friction with the user's fingertips. In operation, the wing 20 may be positioned by the user proximate to the substrate and may be oriented so that the main member 21 and sidewalls 22 extend substantially perpendicularly with respect to a substrate surface. The wing 20 is then urged through the substrate with a leading side 27 thereof first.

The cutting element 30 is attached to the wing 20 at the leading side 27 and is configured to cut through material of the substrate upon initiation of the manual urging. The presence of the cutting element 30 and its ability to cut through the substrate under manual power obviates a need for additional tools, such as power tools, or additional tooling/processing operations, such as the drilling of a pilot hole in the substrate or the like.

Still referring to FIGS. 1 and 2, the cutting element 30 may be formed in various configurations, shapes and sizes. In one exemplary configuration, the cutting element 30 includes a pair of sidewall cutting elements 32, which are respectively attached to each of the sidewalls 22, and a main member cutting element 31, which is attached to the main member 21. The sidewall cutting elements 32 may each be substantially triangular and may be oriented to respectively extend in parallel with planes of each of the sidewalls 22. The main member cutting element 31 may be substantially triangular and angled with respect to the main member 21. In accordance with embodiments, the main member cutting element 31 may be longer than the sidewall cutting elements 32 and the angling of the main member cutting element 31 may be defined about the leading side 27. As such, distal ends of the sidewall cutting elements 32 and the main member cutting element 31 may be disposed in substantial near-alignment with one another in at least one dimension (i.e., along the direction of the urging).

As the wing 20 is urged through the substrate, the main member cutting element 31 initially displaces the substrate material with which it makes contact. As the urging continues and the sidewall cutting elements 32 contact the substrate, this material displacement continues and is eventually supplemented by further material displacement by the sidewall cutting elements 32. In particular, the configurations of the main member cutting element 31 and the sidewall cutting elements 32 are provided such that the material displacement is generally reflective of the size and shape of the wing 20 and that deformation of the substrate beyond the extent of the wing 20 size or shape is accordingly relatively limited.

Figure 3:
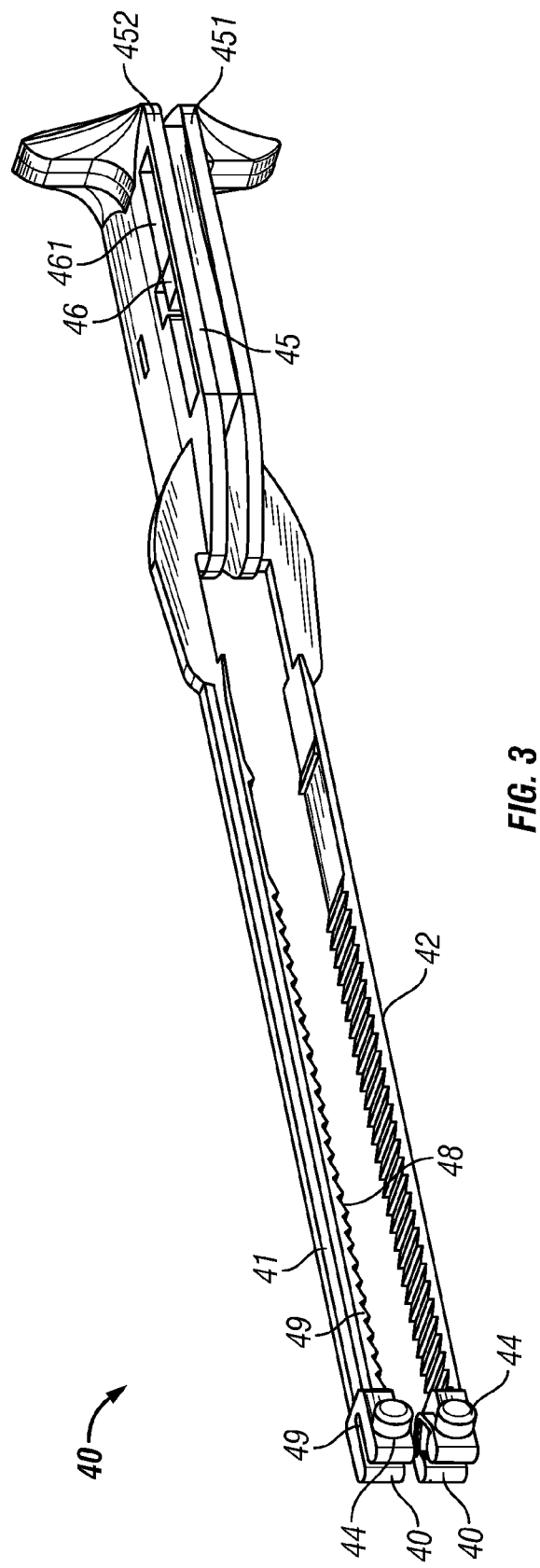
FIG. 3 is a perspective view of a strap assembly of the wall anchor of FIG. 1.

With reference to FIGS. 1 and 3, the strap assembly 40 may be rotatably coupled to the wing 20 and may be configured to be manually gripped and to have a pulling force exerted thereon. The strap assembly 40 may thereby urge the wing 20 against the second side of the substrate following the urging of the wing 20 through the substrate from the first to the second side thereof. While this rotatable coupling may be provided at various locations, as shown in the example of FIGS. 1 and 3, the strap assembly 40 may be rotatably coupled to the sidewalls 22. The strap assembly 40 may include polymeric materials, such as engineered plastic and may be selectively breakable by the user.

The strap assembly 40 may be plural in number, with each strap 41, 42 including an anchor 43, which is connectable to the wing 20, and a handle 45 disposed at a distal end thereof. The anchors 43 may include elastic arms having bosses 44 that are insertable into guide holes 29 formed on opposing sidewalls 22 of the wing 20 (see FIG. 2). The elasticity of the arms maintains the bosses 44 in the guide holes 29 and the substantial circularity of the bosses 44 and the guide holes 29 permits rotations of the straps 41, 42 about the central axes of the bosses 44.

When the wing 20 is urged through the substrate, the ability of the straps 41, 42 to be rotated about the axes of the bosses 44 allows the straps 41, 42 to be received in a cavity defined between the sidewalls 22. As such, as the wing 20 proceeds through the substrate, the straps 41, 42 can be held relatively closely to the main member 21 and contained between the sidewalls 22 and do not substantially damage the substrate or otherwise increase a size of a hole formed therein by the cutting element 30 and/or the wing 20.

Still referring to FIGS. 1 and 3, once the wing 20 is urged through the substrate, the user may grip the handles 45 to pull the straps 41, 42 taut and to thereby pull the wing 20 back against the substrate in a direction B (see FIG. 1). To this end, the handles 45 may be formed with wings 451 and finger slots 452. With the wing 20 forced against the substrate in this manner, the cap 50 may be moved along the straps 41, 42 toward the wing 20 until the cap 50 is substantially adjacent to the substrate. At this point, the handles 45 may be separated from one another by disengagement of a handle boss 46 from a guide slot 461 and the straps 41, 42 may be separated from one another and selectively broken behind the cap 50.

The straps 41, 42 may include steps 48 proximate to the anchors 43. The steps 48 facilitate the selective breaking of the straps 41, 42 and permit cap 50 movement in a first direction, which is in line with direction A. Conversely, the steps 48 inhibit cap 50 movement in a second direction, which is in-line with direction B and opposite the first direction.

That is, as the cap 50 proceeds past the steps 48 along the straps 41, 42, the cap 50 advances in a step-to-step fashion. Each passing step 48 includes a buttress 49 that is configured to impinge upon the cap 50 should an attempt be made to move the cap 50 in the second direction. As such, when the cap 50 is substantially adjacent to the substrate and the straps 41, 42 are selectively broken, the last buttress 49 passed by the cap 50 prevents the cap 50 from undesirably falling away from the substrate beyond up to a predefined minimal distance. In some cases, the last buttress 49 may be positioned to abut the cap 50 with the cap 50 abutting the substrate such that the last buttress 49 tightly holds the cap 50 against the substrate.

Figure 4:
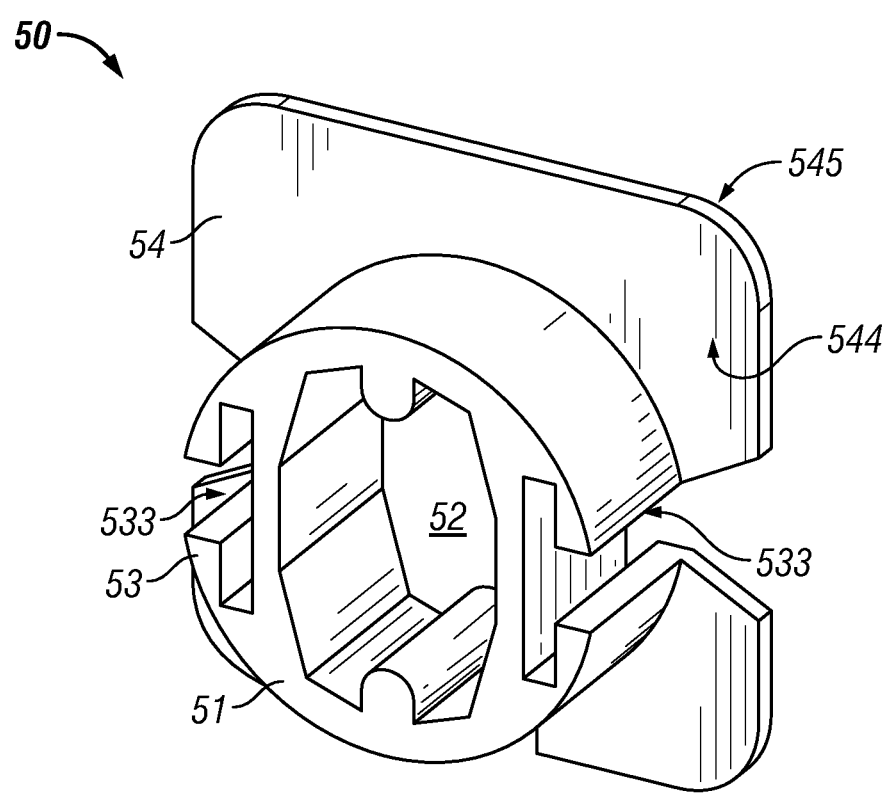
FIG. 4 is a perspective view of a cap of the wall anchor of FIG. 1.

With reference to FIGS. 1 and 4, the cap 50 includes a hub 51, at which a second portion 52, which is engageable with the member, is formed. The cap 50 further includes a guide 53 disposed at a periphery of the hub 51, including a pair of guide slots 533, through which the straps 41, 42 are slideable, and a flange 54 disposed at a periphery of the hub 51 and/or the guide 53. The flange 54 has a first face 544, which is mateable with a substrate surface, and a second face 545, which is opposite the first face 544. The engagement of the second portion 52 with the member may include a reception of the member through the second portion 52 until a rear flange of the member, such as the head of a screw or a bolt, impinges upon a portion of the second face 545 proximate to the second portion 52. Thus, as the member proceeds in direction B, the cap 50 is urged by the member in direction B as well.

The respective engagements of the member with the first portion 21 of the wing 20 and the second portion 52 of the cap 50 are provided and sufficient to draw the wing 20 and the cap 50 toward one another. In this way, the substrate may be generally and relatively tightly interposed between portions of the wing 20 and portions of the cap 50. As such, where the member is a component of a fixture, such as a wall hanging light fixture and the member is a screw or a bolt upon which the light fixture is supported, the fixture may be anchored on the substrate by the wall anchor 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A wall anchor, comprising:
    a wing manually urgeable through a substrate, the wing including an elongate main member having a substantially planar top surface, opposite elongate side edges and a leading edge, and opposing elongate sidewalls respectively attached to the opposing elongate side edges of the main member;
    a cutting element to cut through substrate material upon the manual urging, the cutting element including a main member cutting element having a substantially planar top surface that is obtusely angled relative to the main member top surface and attached to the leading edge of the main member;
    a strap assembly rotatably coupled to the wing and configured to be manually gripped and pulled upon to thereby urge the wing against the substrate; and
    a cap disposed to be movable along the strap assembly, respective engagements of a fastening member with the wing and the cap being sufficient to draw the wing and the cap toward one another.

2. The wall anchor according to claim 1, wherein the wing has a u-shaped configuration.

3. The wall anchor according to claim 2, wherein the wing is engageable with the fastening member at the main member.

4. The wall anchor according to claim 1, wherein the cutting element further comprises sidewall cutting elements respectively attached to each of the sidewalls, the sidewall cutting elements each extending beyond the leading edge of the main member in an elongate dimension of the main member.

5. The wall anchor according to claim 4, wherein the sidewall cutting elements are substantially triangular and respectively extend in parallel with planes of the sidewalls.

6. The wall anchor according to claim 4, wherein the main member cutting element is substantially triangular.

7. The wall anchor according to claim 4, wherein the main member cutting element is longer than the sidewall cutting elements as measured from the leading edge of the main member.

8. The wall anchor according to claim 4, wherein distal ends of the sidewall cutting elements and the main member cutting element are disposed in substantial near-alignment in an elongate dimension of the main member.

9. The wall anchor according to claim 1, wherein the strap assembly comprises:
    a handle at a distal end thereof; and
    steps to permit cap movement in a first direction and to inhibit cap movement in a second direction.

10. The wall anchor according to claim 1, wherein the cap comprises:
    a hub at which the cap is engageable with the member;
    a guide disposed at a periphery of the hub, through which the strap assembly is slideable; and
    a flange disposed at a periphery of the hub or the guide, which is mateable with a substrate surface.

11. A wall anchor, comprising:
    a wing manually urgeable through a substrate, the wing including an elongate main member formed to define a first portion, which is engageable with a fastening member, and opposing elongate sidewalls, the main member having a substantially planar top surface, opposing elongate side edges to which the opposing sidewalls are respectively attached and a leading edge;
    a cutting element to cut through substrate material upon the manual urging, the cutting element including a main member cutting element having a substantially planar top surface that is obtusely angled relative to the main member top surface and attached to the leading edge of the main member;
    a strap assembly rotatably coupled to the wing and configured to be manually gripped and pulled upon to thereby urge the wing against the substrate; and
    a cap disposed to be movable along the strap assembly and formed to define a second portion, which is engageable with the fastening member, respective engagements of the member with the first and second portions being sufficient to draw the wing and the cap toward one another.

12. The wall anchor according to claim 11, wherein the wing has a u-shaped configuration.

13. The wall anchor according to claim 12, wherein the cutting element further comprises sidewall cutting elements respectively attached to each of the sidewalls, the sidewall cutting elements each extending beyond the leading edge of the main member in an elongate dimension of the main member.

14. The wall anchor according to claim 13, wherein the sidewall cutting elements are substantially triangular and respectively extend in parallel with planes of the sidewalls, and
    the main member cutting element is substantially triangular and longer than the sidewall cutting elements as measured from the leading edge of the main member.

15. The wall anchor according to claim 13, wherein distal ends of the sidewall cutting elements and the main member cutting element are disposed in substantial near-alignment in an elongate dimension of the main member.

16. A wall anchor, comprising:
    a wing manually urgeable through a substrate from a first side thereof to a second side thereof, the wing including an elongate main member formed to define a first portion, which is engageable with a fastening member, and opposing elongate sidewalls, the main member having a substantially planar top surface, opposing elongate side edges to which the opposing sidewalls are respectively attached and a leading edge;
    a cutting element to cut through substrate material upon the manual urging, the cutting element including a main member cutting element having a substantially planar top surface that is obtusely angled relative to the main member top surface and attached to the leading edge of the main member;
    a strap assembly rotatably coupled to the wing and configured to be manually gripped and pulled upon to thereby urge the wing against the second side of the substrate following the urging of the wing through the substrate from the first to the second side thereof; and
    a cap disposed to be movable along the strap assembly and formed to define a second portion, which is engageable with the fastening member, respective engagements of the member with the first and second portions being sufficient to draw the wing and the cap toward one another.

17. The wall anchor according to claim 16, wherein the wing has a u-shaped configuration.

18. The wall anchor according to claim 17, wherein the cutting element further comprises sidewall cutting elements respectively attached to each of the sidewalls, the sidewall cutting elements each extending beyond the leading edge of the main member in an elongate dimension of the main member.

19. The wall anchor according to claim 18, wherein the sidewall cutting elements are substantially triangular and respectively extend in parallel with planes of the sidewalls, and the main member cutting element is substantially triangular and longer than the sidewall cutting elements as measured from the leading edge of the main member.

20. The wall anchor according to claim 18, wherein distal ends of the sidewall cutting elements and the main member cutting element are disposed in substantial near-alignment in an elongate dimension of the main member.

21. The wall anchor according to claim 1, wherein the strap assembly comprises a first strap coupled to each of the sidewalls and a second strap coupled to each of the sidewalls.

22. The wall anchor according to claim 11, wherein the strap assembly comprises a first strap coupled to each of the sidewalls and a second strap coupled to each of the sidewalls.

23. The wall anchor according to claim 16, wherein the strap assembly comprises a first strap coupled to each of the sidewalls and a second strap coupled to each of the sidewalls.

24. A wall anchor wing manually urgeable through a substrate from a first side thereof to a second side thereof, the wing being configured to be fastened to a cap disposed on the first side of the substrate and comprising:

an elongate main member having a substantially planar top surface, opposite elongate side edges and a leading edge;

opposing elongate sidewalls respectively attached to the opposing elongate side edges of the main member; and a cutting element to cut through substrate material upon the manual urging, the cutting element including a main member cutting element having a substantially planar top surface that is obtusely angled relative to the main member top surface and attached to the leading edge of the main member.

* * * * *